United States Patent

[11] 3,625,137

[72] Inventor Wallace J. S. Johnson
Berkeley, Calif.
[21] Appl. No. 865,900
[22] Filed Oct. 13, 1969
[45] Patented Dec. 7, 1971
[73] Assignee Up-Right, Inc.
Berkeley, Calif.

[54] TANK TRAILER
7 Claims, 6 Drawing Figs.
[52] U.S. Cl. .................................................. 99/271,
280/5 C
[51] Int. Cl. ................................................... A23l 3/00
[50] Field of Search ........................................ 99/269,
270, 271, 239, 234; 280/5 C, 5 B, 5 A, 5 E, 5 D;
259/95

[56] References Cited
UNITED STATES PATENTS
3,209,675 10/1965 Stimpson ...................... 99/269
3,489,320 1/1970 Mackinnon ................... 280/5

Primary Examiner—Robert W. Jenkins
Attorney—Mellin, Moore & Weissenberger

ABSTRACT: An enclosed tank trailer, balanced and tiltable about a central wheeled axle, and with a filling inlet at its top in vertical alignment with its towing hitch, which can be filled with crushed grapes as it is towed, then tilted one way for transportation to prevent seeds from settling in the outlet, tilted the other way for gravity discharge of the contents, and in which inert gas is used to prevent entry of oxidizing air into the tank at all times during filling, transportation and discharge and is used to discharge the contents from the tank.

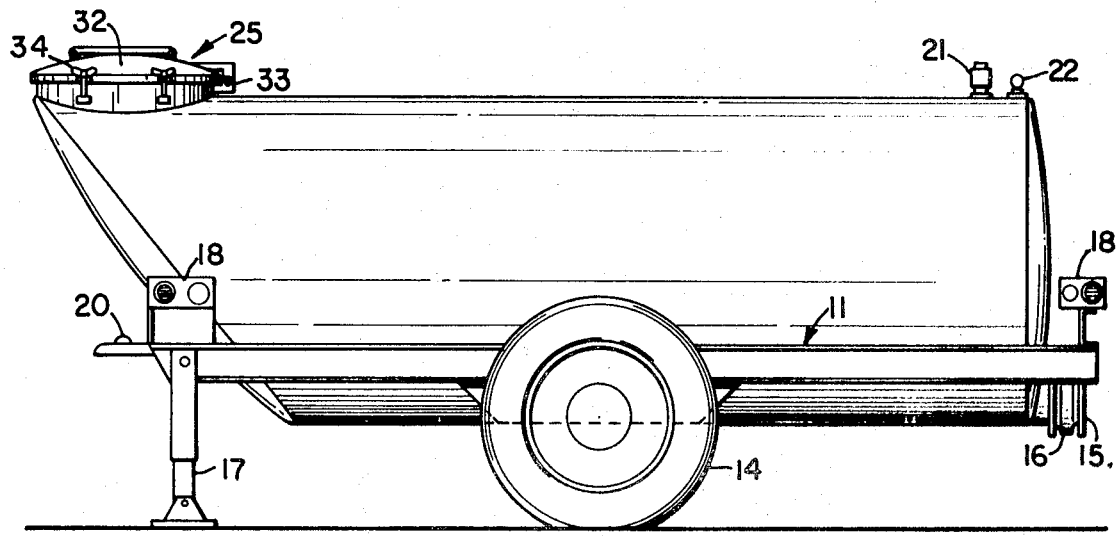
FIG_1
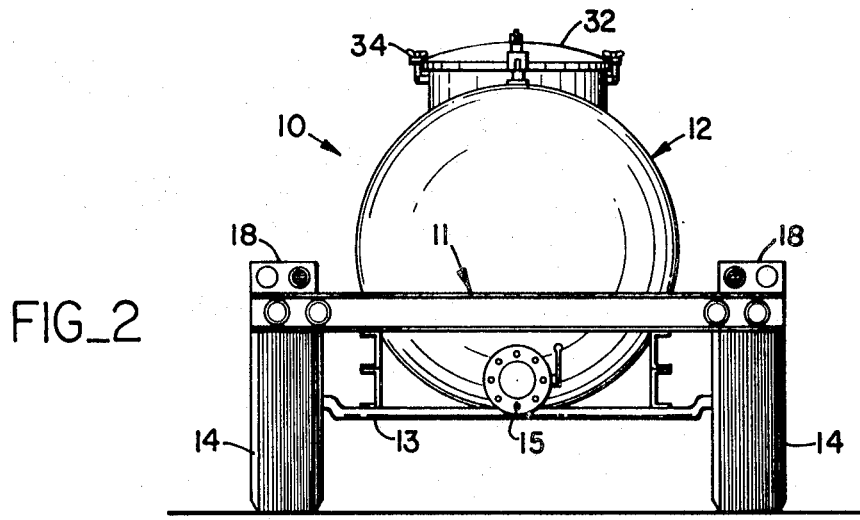
FIG_2
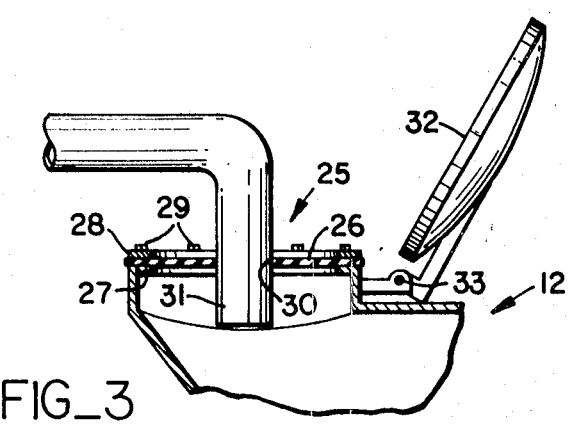
FIG_3
INVENTOR.
WALLACE J. S. JOHNSON
BY
Mellin, Moore + Weissenberger
ATTORNEYS

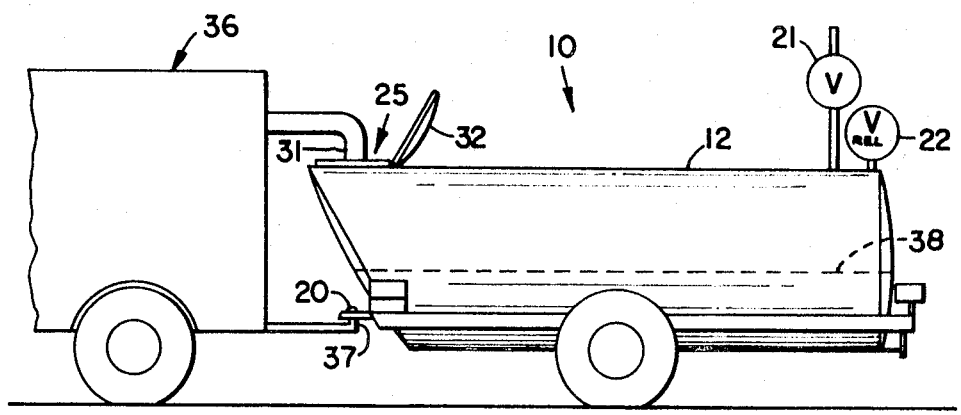
FIG_4
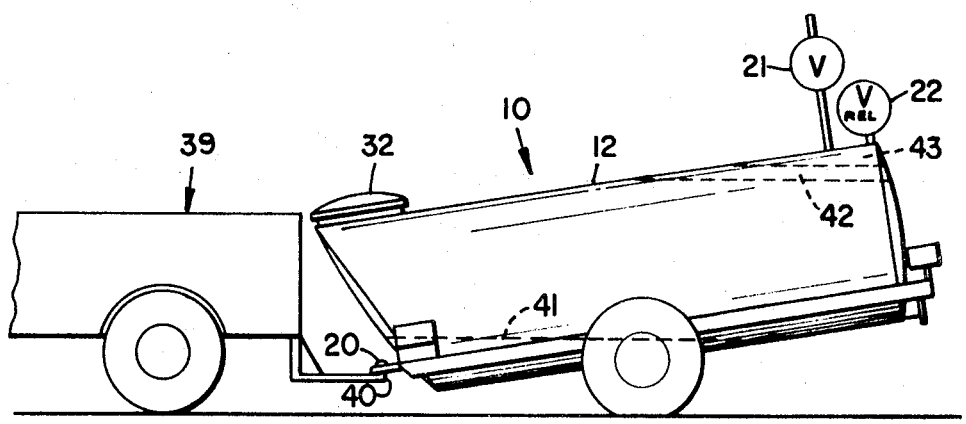
FIG_5
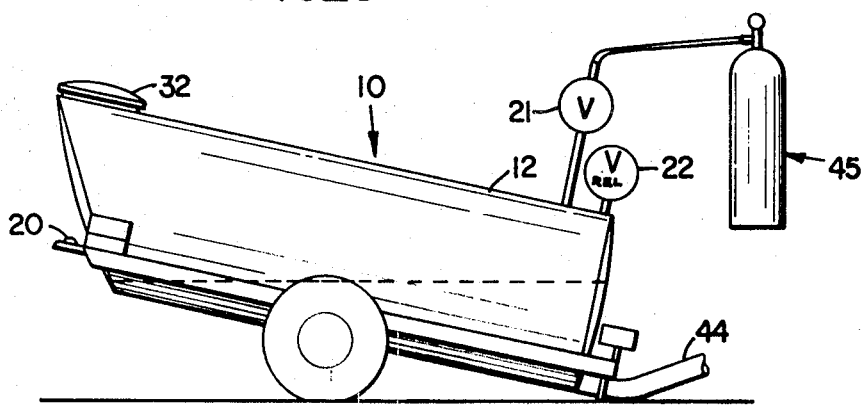
FIG_6

TANK TRAILER

BACKGROUND OF THE INVENTION

This invention relates to tank trailers of the type used at vineyards and wineries in connection with he harvesting of grapes and the subsequent processing of grapes into wine. Grapes are harvested from the vines and crushed to form a slurry of juice, seeds and skins. This slurry, if crushed at a location separate from the winery, is discharged into a tank trailer, which when full, is them taken to the winery where the slurry is emptied in a fermenter. It is of particular importance that the slurry be protected against contamination or oxidation to prevent deterioration of the juice.

Ordinary two-wheel or four-wheel tank trailers have been found to be unsuitable for the efficient transportation of such slurries. In the conventional horizontal position of such cylindrical tanks, the heavy components, such as the seeds, settle to the bottom and compact themselves due to the vibration encountered in travel, which causes clogging of the outlet valve. The light components, such as skins, float to the top and clog the relief valve if one is present. Air in the tank causes undesirable oxidation of the juice. When the tank is to be emptied, it is connected to a pump and the contents pumped therefrom. However, it is difficult to remove the compacted residue, and this must be manually removed and the tank cleaned before it may be reused. This problem is accentuated if a flat-bottom tank is used. On some quality products, pumping will damage the contents.

Also, if an ordinary tank trailer were to be used for the purpose of this invention wherein the trailer is filled while being towed behind another vehicle, it would have to be filled with a hose because of the necessity for a flexible connection to the trailer as it goes around corners or up and down over bumps.

It is the primary object of this invention to overcome the problems presented by the previously used tank trailers.

SUMMARY OF THE INVENTION

Broadly speaking, the present invention provides a tank trailer that is balanced on a central wheeled axle so that it may be easily tilted about the axle. The trailer is brought, full of inert gas, preferably carbon dioxide, and hitched to a traveling grape crusher. The inlet of the tank is on the same vertical centerline as the hitch, so that a fixed vertical pipe in the grape crusher can be used to fill the trailer, even when the grape crusher and trailer turn corners. A flexible diaphragm in inlet embraces the filling pipe to prevent air from entering the tank and allows the tank to move up and down or tilt relative to the filling pipe as the trailer goes over bumps. The flexible diaphragm also enables gas in the tank to escape around the filling pipe as the bank is being filled, to prevent foreign material, such as dust or leaf particles, from entering the tank.

After the tank is filled, it is detached from the crusher and the inlet is closed. The trailer is then towed away and transported to a winery where the contents are to be discharged into a storage tank or directly into a fermenter. During this transportation, the tank is tilted so that the outlet end is elevated and the seeds will settle away therefrom and not clog the outlet. A blanket of inert gas will remain in the tank to prevent oxidation of the contents.

When the trailer is brought to its destination, the trailer is rocked back and forth about the single axle to agitate and mix the contents and put the settled-out seeds or other residue back into suspension in the juice. The tank is then tilted to lower the outlet end, and the outlet is connected to a discharge hose. Inert gas under pressure is introduced into the tank to force the contents out. The angle of tilt and the curved bottom of the tank permits all of the residue to slide to the outlet and be pushed out. The outlet is then closed, with the tank full of inert gas, and the trailer may then be taken back to the crusher for refilling without any need for cleaning the tank.

Thus, the present invention provides an enclosed tank trailer which can be repetitively filled while being towed, transported, emptied without pumping, all without exposure of the contents of the tank to air, and without the need for cleaning the tank between repetitive uses.

Other objects and advantages will become apparent in the course of the following detailed description.

BRIEF DESCRIPTION OF THE DRAWINGS

In the drawings, forming a part of this application, and in which like parts are designated by like reference numerals throughout the same, FIG. 1 is a side elevational view of the tank trailer;
FIG. 2 is a rear elevational view of the tank trailer;
FIG. 3 is a sectional view of the inlet to the tank;
FIG. 4 illustrates the tank trailer as it is being filled from a traveling crushing machine;
FIG. 5 illustrates the tank trailer as it is transported.
FIG. 6 illustrates the tank trailer as it is emptied.

DESCRIPTION OF THE PREFERRED EMBODIMENT

The tank trailer, generally indicated by the reference numeral 10, comprises a frame 11 on which is mounted a generally cylindrical tank 12 extending longitudinally of the frame. The trailer is provided with a single axle 13 transverse of the frame and substantially at the point of balance of the tank and frame. Wheels 14 are carried by the axle 13.

Although the tank 12 is shown as circular in cross section, it could be oval or other shapes as desired. However, the bottom of the tank should be transversely curved to aid in emptying. The tank is provided at its rear end with an outlet 15, controlled by valve 16. The outlet 15 is flush with the bottom of tank 12, and the inside of the bottom of the tank is unobstructed and completely above the outlet when the outlet end is tilted downwardly, FIG. 6, so that the contents of the tank will flow and slide easily from the tank during discharge.

A jack 17 is provided at the front end of frame 11, for support of the trailer when it is not connected to a towing vehicle. The jack is swung upwardly out of the way during towing. Conventional lights and reflectors 18 are mounted on frame 11 for highway use. A standard trailer hitch 20 is mounted on the front end of frame 11.

The tank is provided at its top with valved inlet connection 21 for connection to a source of gas under pressure when the tank is emptied. The top of the tank is also provided with a relief valve 22. The valve is preferably located at the same end of the tank as outlet 15 if it is desired to prevent fouling of the relief valve during transportation.

The forward end of tank 12 slopes upwardly and forwardly so that the inlet 25 is located on top of the tank on the same vertical centerline as that of trailer hitch 20.

The inlet 25, best shown in FIG. 3, includes a horizontally disposed flexible diaphragm 26 secured around its periphery to tank flange 27 by ring 28 and bolts 29. The diaphragm 26 is provided with a central aperture 30 to sealingly embrace a vertical section of filling pipe 31. A cover 32, hinged to the tank 33, is adapted to close off the inlet when the filling pipe is not inserted therein. When closed, the cover is held shut by dogs 34.

In the use of the tank trailer 10, it will be brought up to a vehicle 36 having a crushing mechanism (not shown), and positioned therebehind. The cover 32 is opened and the tank quickly maneuvered into position so that the filling pipe 31 projects down through the diaphragm hole 30, and the trailer hitch 20 is coupled to the hitch ball 37 of the vehicle 36. The gas inside of the tank will be above atmospheric pressure before the cover is opened, and although the internal pressure will equalize, no air will enter during this procedure. Particularly is this so if carbon dioxide is used, since it is heavier than air.

The tank is then filled with the juice slurry 38 as it is towed by vehicle 36. The incoming slurry will displace the gas inside the tank and the gas will vent to atmosphere between the pipe 31 and diaphragm 26. This emission of gas at the inlet connection prevents foreign material, such as dust or leaf particles, from gathering at the inlet during filling.

Since the inlet 25 is on the same vertical centerline as the trailer hitch 20 and hitch ball 37, the tank inlet will remain in the same position relative to vehicle 36 and filling pipe 31 no matter what the angle is between the tank trailer 10 and vehicle 36, thus enabling corners to be turned without affecting the inlet connection. Also because of the flexibility of diaphragm 26, the trailer can tilt in any direction on the filling pipe as the trailer or the vehicle 36 rolls over bumps on he ground.

After the tank is filled, the trailer is unhitched from vehicle 26 and the cover 32 is quickly closed and dogged into place, trapping the inert gas inside. Again, no air will enter during this procedure.

The trailer is then hitched to a vehicle 39 having a hitch ball 40 positioned therein at a height so that the tank 12 is tilted forwardly, as in FIG. 5, and the trailer is towed to its destination. During travel, the heavier seeds 41 will settle to the bottom of the tank away from the outlet end. The skins 42 will rise to the top, but the gas pocket 43 will keep the skins from fouling the relief valve 22. The relief valve is set for about 10 p.s.i.g. and relieves the pressure created by the carbon dioxide that may be generated by initial fermentation of the juice.

When the trailer reaches its destination, it is unhitched from vehicle 39 and the tank is rocked back and forth to partially mix the contents. The tank is then tilted rearwardly, FIG. 6, a discharge hose 44 is connected to the outlet 15, the relief valve 22 is closed, a source of carbon dioxide under pressure 45 is connected to inlet 21, outlet valve 16 is opened, and the contents are discharged through hose 44.

After the trailer has been emptied, the outlet valve 16 and valved inlet 21 are closed to trap the carbon dioxide therein. Since no air is introduced into the tank during the filling, transportation or emptying, the tank may be reused without cleaning. The trailer is then towed back to the vineyard for refilling.

If desired, the carbon dioxide source 45 may be carried on the trailer and permanently connected to the valved inlet 22.

Having thus described my invention, I claim:

1. A tank trailer comprising:
   a frame,
   a closed tank mounted on and extending longitudinally of said frame,
   a single axle extending transversely of said frame substantially at the balance point of said frame and tank,
   an inlet into said tank,
   an outlet from said tank at one end and at the bottom thereof,
   the bottom of said tank being transversely curved and said outlet being completely below the entire bottom of said tank when said tank and frame are tilted about said axle to lower the outlet end of said tank,
   a valved connection into said tank, said valved connection being adapted to be connected to a source of gas under superatmospheric pressure,
   means associated with said inlet for yieldably sealing to a filling spout inserted into said inlet to allow gas under atmospheric pressure within said tank to vent to atmosphere around said spout.

2. A tank trailer comprising:
   a frame,
   a closed tank mounted on and extending longitudinally of said frame,
   a single axle extending transversely of said frame substantially at the balance point of said frame and tank,
   an inlet into said tank,
   an outlet from said tank at one end and at the bottom thereof,
   means associated with said inlet for yieldably sealing to a filling pipe inserted into said inlet to allow gas as superatmospheric pressure within said tank to vent to atmosphere around said spout.

3. A tank trailer as set forth in claim 2 and further including:
   a trailer hitch mounted at one end of said frame, said trailer hitch and said inlet being on the same vertical centerline.

4. A tank trailer comprising:
   a frame,
   a closed tank mounted on and extending longitudinally of said frame,
   a single axle extending transversely of said frame substantially at the balance point of said frame and tank,
   an inlet into said tank,
   an outlet from said tank at one end and at the bottom thereof,
   a trailer hitch mounted at one end of said frame, said trailer and said inlet being on the same vertical centerline,
   said inlet having a generally horizontal diaphragm extending thereacross, said diaphragm having a central aperture and being adapted to sealingly embrace a filling pipe inserted through said aperture.

5. A tank trailer as set forth in claim 4, and further including:
   a cover member on said tank for closing engagement with said inlet,
   a relief valve connected to said tank to vent the interior thereof to atmosphere when the pressure therein exceeds a predetermined value.

6. A tank trailer as set forth in claim 5 and further including:
   a valved connection into said tank, said valved connection being adapted to be connected to a source of gas under superatmospheric pressure.

7. A tank trailer as set forth in claim 6, wherein the bottom of said tank is transversely curved and said outlet is below the entire bottom of said tank when said tank and trailer are tilted about said axle to lower the outlet end of said tank.

* * * * *